United States Patent
Spontelli

[15] 3,691,604
[45] Sept. 19, 1972

[54] FERRULE SETTING APPARATUS
[72] Inventor: Leonard P. Spontelli, Seven Hills, Ohio
[73] Assignee: Crawford Fitting Company, Solon, Ohio
[22] Filed: April 15, 1971
[21] Appl. No.: 134,153

[52] U.S. Cl. ..............29/200 B, 29/252, 29/282, 29/407
[51] Int. Cl. ....B23p 19/00, B23p 19/04, B23q 17/00
[58] Field of Search.........29/200 B, 200 R, 252, 240, 29/517, 407

[56] References Cited

UNITED STATES PATENTS

| | | |
|---|---|---|
| 3,096,876 | 7/1963 | Scuderi.........................72/343 |
| 3,156,284 | 11/1964 | Stanley.........................29/282 |
| 3,267,568 | 8/1966 | Johnson et al............29/252 X |

Primary Examiner—Thomas H. Eager
Attorney—Fay, Sharpe and Mulholland

[57] ABSTRACT

Apparatus for swaging a ferrule onto the outer peripheral surface of a cylindrical member such as a tube or rod. The apparatus shown in the drawings includes a piston mounted for reciprocation within a body. The piston is drivingly connected to an anvil-like member which includes a recess in one end for receiving the end of the tube or rod. Carried within the recess is a camming mouth adapted to swage a ferrule inwardly onto the surface of the tube or rod. The body includes means for connection thereto of means for limiting axial movement of the ferrule received over the end of the tube or rod. Additionally, pressure means are connected in fluid communication with the interior of the body for driving the piston toward the ferrule and means are provided for measuring the axial movement of the piston relative to the body.

18 Claims, 4 Drawing Figures

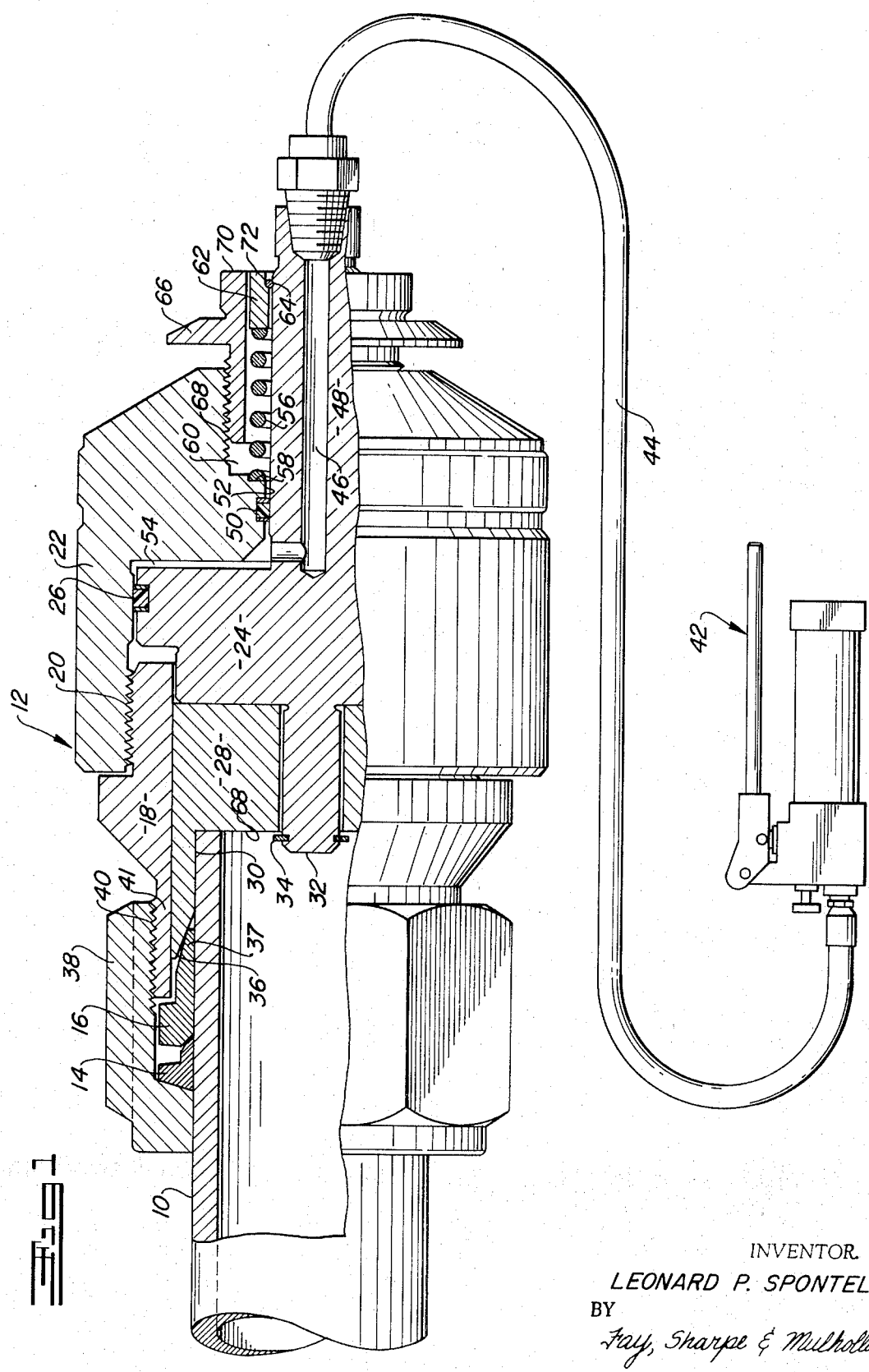

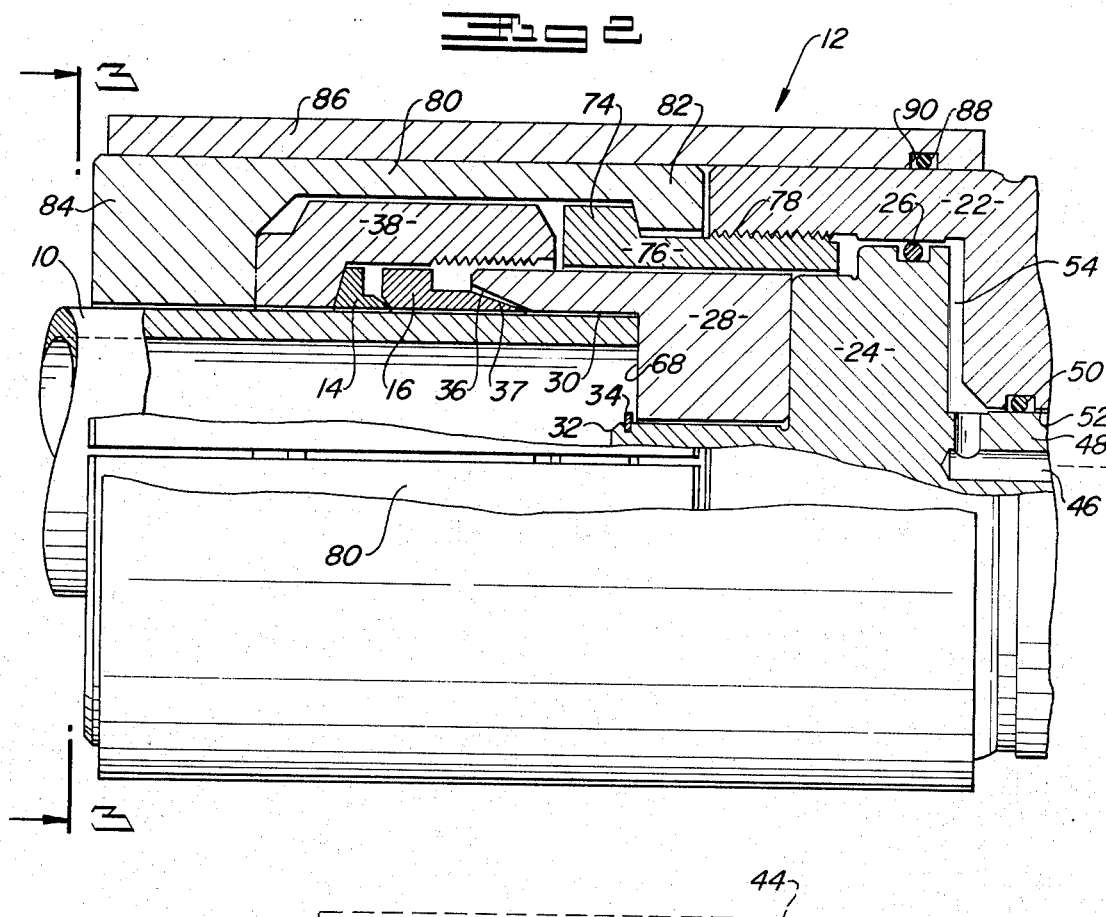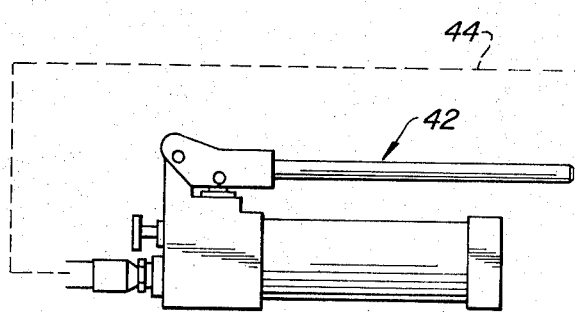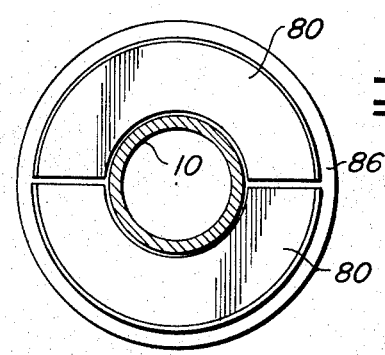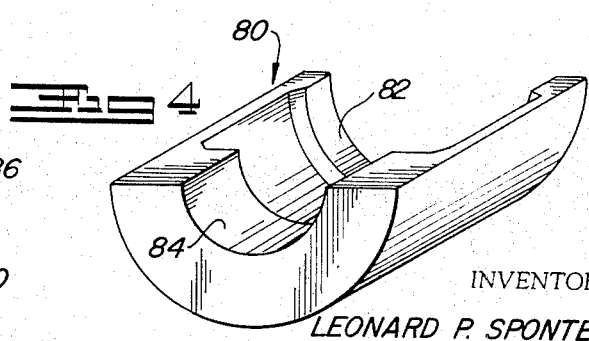

FERRULE SETTING APPARATUS

BACKGROUND OF THE INVENTION

This invention is directed toward the joint or coupling art and, more particularly, to an improved apparatus for swaging a ferrule to the outer surface of a cylindrical member.

The invention is especially suited for attaching ferrules to the outer surface of a tube or pipe during installation of swage-type fittings and will be described with particular reference thereto; however, it will be appreciated the invention is capable of broader application and could be used for other purposes.

Tube or pipe fittings which employ one or more swaged ferrules on the periphery of a tube to make metal-to-metal seals at a joint are in widespread use. For the most part, these fittings have been applicable primarily only with small sized tubes or those which are of relatively soft metallic materials. Experience has shown that the swaged ferrule-type fittings with their metal-to-metal sealing surfaces are particularly effective in providing strong, leak-tight joints. Consequently, it has become increasingly desirable to use the swaged ferrule concept with large diameter tubes and rods, thick walled tubes, and tubes and rods of relatively hard material.

As can be appreciated, to function properly, the swaged ferrule must grasp the periphery of the tube or rod and force it radially inwardly a slight amount to achieve a satisfactory grip on the tube. Generally, there must be no substantial deformation of the tube but only a slight inward dip to accommodate the inwardly swaged nose portion of the ferrule.

With fittings currently in use, the ferrules are typically swaged into sealing position by manual tightening of a coupling nut which forces the nose portion of the ferrule against a camming mouth in an associated body member. The camming mouth deforms the nose radially inward into tight sealing engagement with the periphery of the tube or rod being coupled. When the cylindrical member is formed of relatively hard materials, or has a large diameter or thick wall, it may be extremely difficult, and sometimes even impossible to manually apply to the coupling nut the amount of torque necessary to produce the appropriate degree of ferrule deformation.

Power actuated ferrule swaging devices have been proposed in the prior art. Generally, these prior art devices have been somewhat complicated and cumbersome. For example, one known device utilizes a die block assembly which engages the ferrule. A frame is connected between the die block assembly and a hydraulic assembly. Actuation of the cylinder drives a die or camming member into engagement with the tube end and the ferrule to drive the die member toward the die assembly and swage the ferrule. As can be appreciated, the die assembly must include a pair of split die blocks and an outer retaining frame or sleeve. This is required since after application of ferrules to opposite ends of the tube, the die block assembly must be dis-assembled for removal from the tube.

The use of the die blocks has substantial disadvantages. First, it complicates both the manufacture and use of the device. Further, when used to apply the ferrules for the tube fittings, the die blocks can result in faulty joints. For example, if the die blocks do not mate properly with each other, the ferrules can be cocked on the tube and their outer surfaces scared or deformed. Similarly, if the die blocks are accidentally slightly damaged, several ferrules may be defectively applied before the damage is noticed. An additional disadvantage of the prior power actuated swaging devices is that they provide no accurate way by which the operator can determine whether or not adequate swaging has been accomplished.

The above and other problems are overcome by the subject invention in a particularly simple and effective manner. In accordance with one aspect, the invention contemplates apparatus for pre-swaging to the outer surface of a cylindrical member the ferrules of fittings of the type including a coupling nut having an internal threaded opening adapted to encircle the cylindrical member and an associated ferrule or ferrules positioned on the cylindrical member. The apparatus preferably comprises first means for engaging and positioning the end of a cylindrical member on which a fitting is to be connected; and, camming means associated with the first means and sized to extend inwardly from the end of the member between the outer periphery of the member and the internal opening of the coupling nut. Second means are provided for engaging and positioning the coupling nut and, power means are arranged to produce non-rotary relative movement toward one another of the camming means and the coupling nut portion to cause a ferrule positioned therebetween to be swaged onto the outer surface of the cylindrical member.

Since the coupling nut of the fitting acts in combination with the cam means to swage the ferrule, or ferrules, there is less likelihood of improperly swaged or damaged ferrules than with the split die block type of swaging apparatus. Additionally, by the elimination of the die block members the apparatus can be made less cumbersome. Further, since it is not necessary to continually connect and disconnect die block members, the apparatus is capable of more rapid operation.

In accordance with another more limited aspect, the invention contemplates that the apparatus will be operated by a hydraulic cylinder assembly. Preferably, the apparatus includes a hand operated hydraulic pump which is operatively connected to the cylinder assembly by means of a flexible conduit. The assembly includes a piston mounted within a cylinder to reciprocate in response to the hydraulic pressure applied from the hand pump. Connected with one end of the piston is an anvil-like member which includes a cylindrical recess for receiving an end of a tube or rod. A camming mouth within the recess is shaped to swage the nose portion of a ferrule inwardly onto the periphery of the tube or rod projecting into the recess. Means are provided for aligning the tube and ferrule with the anvil recess and for limiting the axial movement of the ferrule when the piston moves. Additionally, further means are provided for measuring the relative axial movement of the piston with respect to the body for the purpose of ascertaining when the ferrule has been adequately swaged.

It is important to note that an accurate way of ascertaining whether adequate swaging has been accomplished is by a positive measurement of relative axial movement of the piston. A measurement of hydraulic pressure within the cylinder is inadequate as a proper indication of swaging because the ferrule could be slightly cocked on the tube resulting in force-pressure build up with inadequate swaging around the whole periphery of the ferrule. Similarly, binding within the apparatus itself could cause a pressure build up without the needed swaging. Where the relative piston movement is measured as by the device of this invention, there can be no question as to the amount of swaging.

A primary object of the invention is the provision of a power operated ferrule swaging apparatus which provides a positive indication of when the swaging operation is properly completed.

Another object is the provision of an apparatus of the type described which does not require die blocks or the like.

A further object is the provision of power actuated preswaging apparatus for ferrules which is simple in construction and operation.

These and other objects and advantages will become apparent from the following description when read in conjunction with the accompanying drawings wherein:

BRIEF DESCRIPTION OF THE DRAWINGS

FIG. 1 is a side elevational view partially in section of a ferrule swaging apparatus formed in accordance with a preferred embodiment of the invention;

FIG. 2 is a fragmentary side elevational view, partially in section, of a modified version of the device;

FIG. 3 is an end elevational view taken along line 3—3 of FIG. 2; and,

FIG. 4 is a perspective view, in reduced scale, of one of the half-shells used in the modification of FIG. 2 for aligning and limiting the axial movement of the ferrule.

PREFERRED EMBODIMENTS

Referring more particularly to the drawings, FIG. 1 shows the overall arrangement of a preferred form of power actuated ferrule setting apparatus formed in accordance with the essential principles of the invention. While it is to be appreciated that the device could be used for setting or swaging ferrules on many types of elongated cylindrical members, it is shown in the drawings as being used for swaging ferrules to the outer peripheral surface of a pipe or tube 10. As shown, the setter includes a body 12 into which the tube 10 projects. Both FIGS. 1 and 2 show two ferrules 14 and 16 being applied to the cylindrical member 10; however, it is to be understood that the device is equally adapted for use with a single ferrule, or with ferrules in excess of two.

Although the device could have a variety of different constructions, in the embodiment under consideration, the body 12 includes a flanged sleeve member 18 which is threaded at 20 into a coaxially aligned cylinder 22. Carried within the cylinder 22 and arranged for reciprocation therein, is a piston 24. A suitable packing or piston ring means 26 is carried about the periphery of the cylinder 22 to provide a seal with the internal cylinder wall.

Carried at the left-hand end of the piston 24 (as viewed in FIG. 1) is an anvil member 28. In the construction shown, the anvil member 28 is drivingly connected with the piston by being mounted on projection 32 formed on piston 24. A snap ring 34 releasably connects the anvil member to the piston. Extending axially inwardly from the left end of anvil 28 is a recess 30. The recess is sized so as to receive closely the end of the tube 10 and align it with the body 12.

As can be appreciated, the anvil member 28 is closely and slidably received within the sleeve 18 thus to maintain the anvil aligned with the piston 24. Positioned about the recess 30 is an inclined camming surface 36 which, in the embodiment under consideration, is integrally formed on the anvil 28. This surface 36 forms a camming mouth which functions to cam the forward nose portion 37 of the ferrule 16 inwardly into tight sealing and gripping engagement with the periphery of the tube 10 in a manner hereafter to be described.

In the embodiment under consideration, the apparatus is used for pre-swaging the ferrules of a well known tube fitting sold under the Swagelok trademark. Member 38 is the coupling nut component of the tube fitting and has an internal threaded opening 40 which surrounds the tube and the ferrules 14 and 16 and which is intended ultimately to be connected with mating threads of the coupling body (not shown) of the fitting. The coupling nut 38 is utilized to assist in the swaging operation. As can be seen, the sleeve 18 has an outer end portion 41 which is sized so as to be threadedly received within the opening 40 of the nut. When the nut is so positioned, the ferrules 14 and 16 are thus entrapped between the nut and the camming mouth 36 of anvil 28. By then producing relative movement toward one another of the nut 38 and the anvil 28, the required swaging of the ferrules 14 and 16 into engagement with the outer surface of the tube 10 is accomplished.

Many different power arrangements could be utilized for producing the required relative movement; however, according to the subject invention, it is preferable to use a hydraulic power cylinder arrangement. Specifically, the piston 24 is driven to the left relative to the cylinder 22 by hydraulic pressure supplied from a conventional hand operated hydraulic pump 42. The pump 42 is connected in fluid communication with the interior of the cylinder 22 through a flexible conduit 44 and a passage 46 which extends through an axially directed rear extension 48 of the piston 24. Suitable packing means 50 in a rear cylinder opening 52 seals around the extension 48 and together with the packing means 26 and 50, renders the cylinder cavity 54 leak tight at both ends. In the embodiment shown, the piston 24 is normally biased to the right (as viewed in FIG. 1) by a spring 56 positioned about the extension 48. The left end of the spring abuts a shoulder 58 formed by a counterbore 60, whereas, the right end abuts the inner end of a gauging sleeve 62 which is held on the extension 48 by a stop means shown in the form a a snap ring 64. An adjustable dial or gauging member 66 is threaded at 68 into the counterbore 60 for purposes which will subsequently be explained.

In operation of the device shown in FIG. 1, the nut or female body portion 38 and the ferrules 14 and 16 are mounted on the tube 10 and the forward end of the tube is pushed into the recess 30 until it bottoms at the face 68. The nut 38 is threaded onto the end portion 41 of sleeve 18 until it is "hand tight". It should be noted that "hand tight" in this case does not indicate the beginning of the measured swaging operation and it is not absolutely necessary that the operator be meticulous in his hand tightening of the nut 38.

After the tube 10 is in place and the nut 38 threaded onto the sleeve 18, the pump 42 is actuated to supply fluid to the cylinder cavity 54 until sufficient pressure has built up to snug the ferrules against the surface of the tube. This condition can readily be detected by hand, in that the operator will no longer be able to rotate the tube 10. When this amount of rigidity has been obtained in the joint, the device is ready to begin the measured swaging operation. First, dial member 66 is adjusted so that its outer face 70 lies in the plane of the outer face 72 of the gauging sleeve 62. Secondly, dial 66 is threaded into the bore 60 a predetermined distance which corresponds to the amount the anvil 28 must advance linearly relative to the coupling nut 38 in order properly to swage the ferrules into position on the tube. Thereafter, the hand pump 42 is operated to drive the piston toward tube 10 (carrying gauging sleeve 62 with it) until the faces 70 and 72 again lie in the same plane. At that time, the ferrules 14 and 16 will have been swaged against the surface of tube 10 the requisite amount to obtain the proper degree of grip and seal. Appropriate valving on the pump can then be opened to release the fluid in the cavity 54 so that the spring 56 will return the piston to the rest position.

In practice, most fitting manufacturers prescribe the number of coupling nut turns necessary for make-up. This number is ordinarily uniform over a broad range of fitting sizes and in fact is uniform for several of the most popular fitting brands.

Accordingly, it is quite convenient to select the same pitch for the threads 68 interconnecting dial 66 and cylinder 22 as for threads 40 interconnecting coupling nut 38 and sleeve 18. If this is done, the operator, for measured gauging purposes, need only advance the dial 66 into the counterbore 60 the same number of turns as he would advance the coupling nut on the coupling body if he were taking the fitting up manually.

Such an arrangement is, of course, not necessary but it does add to the convenience with which the device may be used. As to those fittings which, either by design or by peculiarity of application, require a greater or a lesser number of turns for make up, it is a relatively simple matter to convert that number into an appropriate number of turns for dial 66.

The FIG. 1 embodiment is the preferred form of the invention since the entire assembly can be connected and disconnected from the coupling nut without the use of split clamps, spring fingers, or the like. However, it should be appreciated that other types of connecting means could be interposed between the power pistons, camming members and the coupling nut. For example, FIG. 2 shows a modification of the invention which allows the coupling nut to be used in place of the prior art die block assemblies. The primary difference between the embodiments of FIGS. 1 and 2 lies essentially in the manner in which the power portion of the assembly is connected to the coupling nut. In the device of FIG. 1 the means on the body 12 for connection of the aligning and limiting means is the threads 40; the aligning and limiting means is the nut 38. In the embodiment of FIG. 2 the means on the body for connecting thereto the aligning and limiting means is the flange 74 on sleeve 76 which is attached to cylinder 22 by interengaging threads 78. It should be noted that the nut 38 shown in FIG. 1 is also shown in FIG. 2, however, the threads are not engaged in FIG. 2.

Two semi-cylindrical half-shells 80 are clamped around the nut 38 to hold it in place. Each half-shell 80 has an inwardly extending flange at each end. The flanges 82 at one end slip behind the flange 74 on the sleeve 76 and this prevents relative axial movement between the body 12 and the half-shells 80. Flanges 84 on the opposite ends of the half-shells 80 serve as an abutment to hold the nut 38 in place and prevent its axial displacement with respect to the body 12. In combination, the two half-shells align the tube and ferrules with the recess and camming mouth and limit relative axial movement of the body, nut and ferrules.

A circumferentially extending retaining sleeve 86 telescopes over the half-shells 80 to prevent their radial separation when they are properly in place and hooked behind the sleeve flange 74. An O-ring 88 housed in an inwardly opening groove 90 in the retaining sleeve 86 serves the purpose of providing frictional engagement between sleeve 86 and the cylinder 22 to prevent gross slippage between the elements. Thus, the sleeve 86 may be easily moved manually but will not accidentally slip off the cylinder.

In both the FIG. 1 and 2 embodiments, it is important to note that the nut 38 functions to engage the end of the ferrules opposite the camming mouth. Thus, the nut itself serves in the swaging operation and no special dies or the like are required. The importance of this relationship is that for each operation, the nut which will be utilized in the joint is cooperatively functioning to produce the swaging. Thus, there can be no misalignment between the nut and the ferrules as can result from use of separate die members. Further, the arrangement allows the actuating mechanism to be utilized more rapidly than with certain prior art-type devices.

The invention has been described in detail sufficient to enable one of ordinary skill in the art to make and use the same. Obviously, modifications and alterations of the preferred embodiment will occur to others upon a reading and understanding of the specification and it is my intention to include all such modifications and alterations as part of my invention so far as they come within the scope of the appended claims.

What is claimed is:

1. Apparatus for swaging a ferrule onto the periphery of a cylindrical member comprising:
   a piston mounted for reciprocation within a body;
   an anvil member cooperatively associated for movement with the piston;
   a cylindrical recess in said anvil member for receiving the end of a cylindrical member and said recess including a camming mouth;
   means carried by said body for connection thereto of means for (a) aligning the cylindrical member with said recess and (b) limiting axial movement of a ferrule received over the end of the cylindrical member;
   pressure means connected in fluid communication with the interior of the body for driving the piston toward the ferrule; and,
   means for measuring the axial movement of said piston relative to said body.

2. The apparatus of claim 1 wherein the pressure means comprises a fluid pump connected to an extension of said piston, said extension projecting through an opening in said body, and said extension including a fluid passage communicating with the interior of the body.

3. The apparatus of claim 2 further including a counterbore in said body circumscribing said extension, biasing means in said counterbore for urging a gauging sleeve outwardly of said counterbore, said gauging sleeve being limited in its outward movement by step means; the means for measuring comprising a rotary dial threaded into said counterbore; and, means associated with the dial and the gauging sleeve to indicate a given length of axial movement of said piston relative to said body.

4. The apparatus of claim 3 wherein said length is measured in fractions of thread pitch.

5. The apparatus of claim 1 wherein the means on said body for connection thereto of means for (a) aligning the cylindrical member with said recess and (b) limiting axial movement of a ferrule received over the end of the cylindrical member comprises threads on the body.

6. The apparatus of claim 5 wherein said body includes a sleeve coaxially connected to a cylinder, said sleeve being threaded on each end and including an outwardly extending flange intermediate the ends, one end of the sleeve being threadedly connected to the cylinder.

7. The apparatus of claim 1 wherein the body comprises a cylinder coaxially connected to a sleeve.

8. The apparatus of claim 7 wherein the means on said body for connection thereto of means for (a) aligning the cylindrical member with said recess and (b) limiting axial movement of a ferrule received over the end of a cylindrical member comprises a flange on the coaxially connected sleeve and substantially semicylindrical shell means for circumscribing the cylindrical member and for limiting axial movement of a coupling nut relative to the sleeve, said shell means being mechanically connected to said flange.

9. The apparatus of claim 8 wherein the shell means include inwardly extending flanges at each end, the inwardly extending flanges at one end hooking over the outwardly extending sleeve flange, the inwardly extending flanges at the other end being adapted to engage the rear of the coupling nut to limit its axial movement relative to said sleeve.

10. The apparatus of claim 9 including a retaining sleeve telescoped over said shell means to prevent their radial separation and disengagement from the coaxially connected sleeve.

11. Apparatus for swaging a ferrule onto the periphery of a cylindrical member comprising:
a piston mounted for reciprocation with a body;
an anvil mounted on the piston having a recess in one end to receive the end of the cylindrical member; the recess including a camming mouth;
said camming mouth being adapted to cam a ferrule carried on the end of the cylindrical member into tight peripheral engagement therewith;
means on said sleeve for connection thereto of means for (a) supporting the cylindrical member concentric with the recess in said anvil and (b) limiting axial movement of a ferrule received over the end of the cylindrical member;
pressure means in fluid communication with the interior of said body adapted to drive the piston toward the end of a cylindrical member; and,
gauge means associated with an extension on said piston to measure the movement of the piston relative to the body.

12. The device of claim 11 wherein the body comprises a cylinder coaxially connected to a sleeve, said gauge means being associated with the end of the cylinder remote from the coaxially mounted sleeve.

13. The device of claim 12 wherein the gauge means is calibrated to measure in fractions of the thread pitch of the threaded joint to be formed subsequently.

14. Apparatus for pre-swaging to the outer surface of a cylindrical member the ferrules of fittings of the type including a threaded coupling nut having an internal opening and adapted to encircle the cylindrical member and an associated ferrule positioned on the cylindrical member, said apparatus comprising:
first means for engaging and positioning the end of a cylindrical member on which fitting is to be connected;
camming means associated with said first means and sized to extend inwardly from the end of said member between the outer periphery of the member and the internal opening of the coupling nut;
second means for engaging said coupling nut; and,
power means for producing non-rotary relative movement toward one another of said camming means and said coupling nut to cause a ferrule positioned therebetween to be swaged on the outer surface of said cylindrical member.

15. The apparatus as defined in claim 14 wherein said power means comprises a hydraulic cylinder assembly connected between said camming means and said second means.

16. The apparatus as defined in claim 14 wherein said second means comprises a threaded sleeve member adapted to encircle said camming means and to be threadedly connected with the coupling nut.

17. The apparatus as defined in claim 14 wherein said first means comprises a recess sized to receive said cylindrical member and wherein said camming means is positioned about said recess.

18. The apparatus as defined in claim 14 including means for indicating the degree of relative movement which takes place between said camming means and the coupling nut.

* * * * *